US009826447B2

(12) United States Patent
Sakai

(10) Patent No.: US 9,826,447 B2
(45) Date of Patent: Nov. 21, 2017

(54) COMMUNICATION APPARATUS, METHOD FOR CONTROLLING COMMUNICATION APPARATUS, AND PROGRAM

(71) Applicant: CANON KABUSHIKI KAISHA, Tokyo (JP)

(72) Inventor: Tatsuhiko Sakai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 352 days.

(21) Appl. No.: 13/688,780

(22) Filed: Nov. 29, 2012

(65) Prior Publication Data

US 2013/0142170 A1 Jun. 6, 2013

(30) Foreign Application Priority Data

Dec. 1, 2011 (JP) .................................. 2011-263420

(51) Int. Cl.
H04W 36/08 (2009.01)
H04W 76/04 (2009.01)
H04W 88/04 (2009.01)

(52) U.S. Cl.
CPC ......... H04W 36/08 (2013.01); H04W 76/043 (2013.01); H04W 76/046 (2013.01); H04W 88/04 (2013.01)

(58) Field of Classification Search
CPC ... H04W 36/08; H04W 88/04; H04W 76/043; H04W 76/023; H04W 76/025; H04W 76/026

See application file for complete search history.

(56) References Cited

U.S. PATENT DOCUMENTS

| 7,126,926 B1* | 10/2006 | Bjorklund | ............. | H04W 16/00 370/328 |
| 2005/0032535 A1* | 2/2005 | Shitama | ................ | H04W 48/16 455/512 |
| 2008/0056200 A1* | 3/2008 | Johnson | ........................ | 370/333 |
| 2008/0285520 A1* | 11/2008 | Forte | ................. | H04W 36/0011 370/331 |
| 2009/0111510 A1* | 4/2009 | Ono | ........................... | 455/552.1 |
| 2009/0213760 A1* | 8/2009 | Shin et al. | ..................... | 370/254 |
| 2011/0038311 A1* | 2/2011 | Marin et al. | .................. | 370/328 |
| 2011/0149899 A1* | 6/2011 | Le | .......................... | H04W 72/02 370/329 |

(Continued)

FOREIGN PATENT DOCUMENTS

| JP | 2004-336351 A | 11/2004 |
| JP | 2005-64552 A | 3/2005 |
| JP | 2007-037111 A | 2/2007 |

(Continued)

*Primary Examiner* — Omer S Mian
(74) *Attorney, Agent, or Firm* — Canon U.S.A., Inc. IP Division

(57) ABSTRACT

A communication apparatus includes a determination device configured to, in a case where the communication apparatus connects to a first network of a first base station via a first frequency channel and the communication apparatus participates in a second network via the first frequency channel without connection to a base station, determine whether a second frequency channel used by a second base station is usable in the communication performed, and a control device configured to control the communication without connection to the base station according to the determination by the determination device.

22 Claims, 7 Drawing Sheets

(56) References Cited

U.S. PATENT DOCUMENTS

2013/0102314 A1* 4/2013 Koskela ............ H04W 36/0072
455/436
2014/0274066 A1* 9/2014 Fodor .................. H04W 36/08
455/437

FOREIGN PATENT DOCUMENTS

| JP | 2008-271011 A | 11/2008 |
| JP | 2009-239371 A | 10/2009 |

* cited by examiner

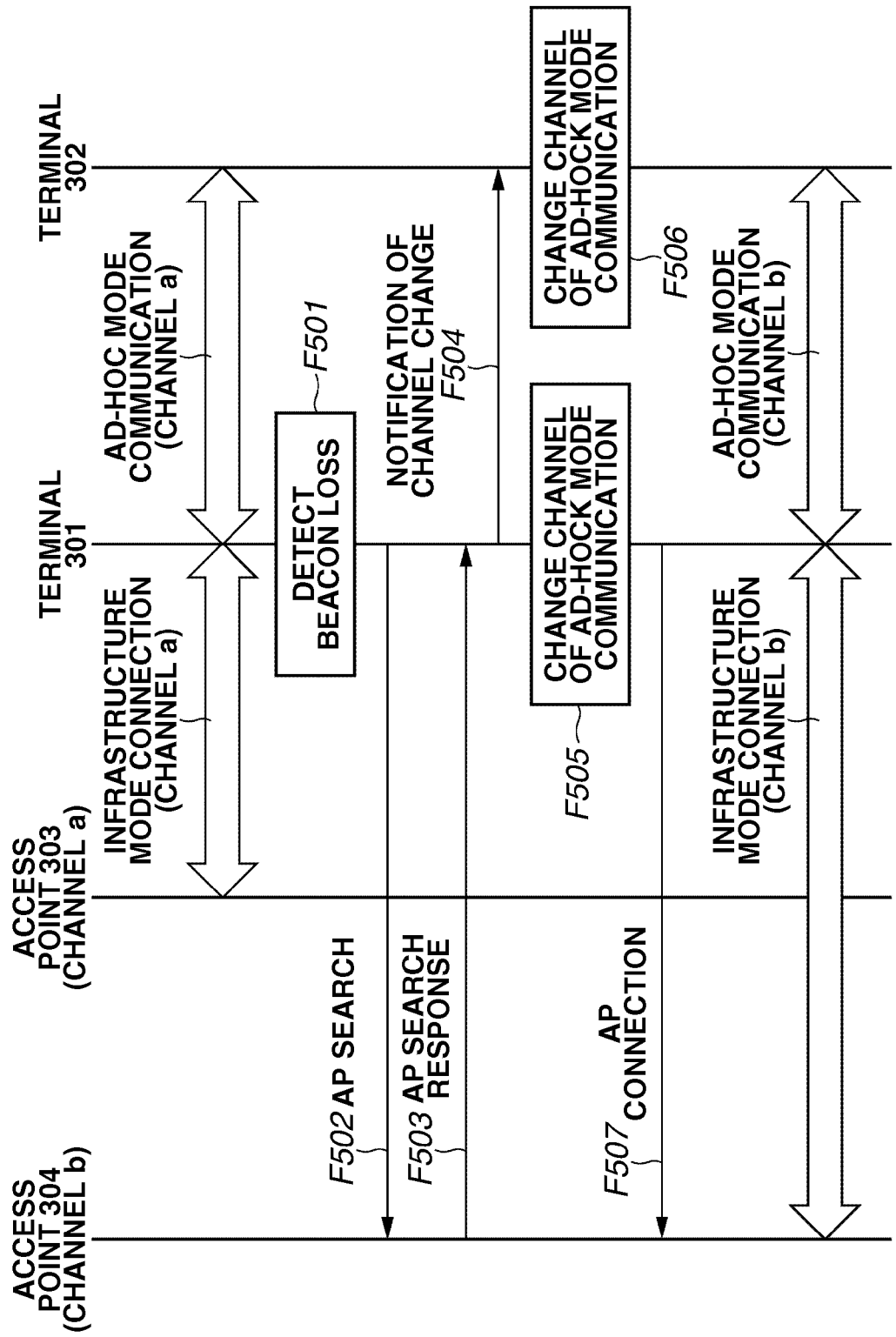

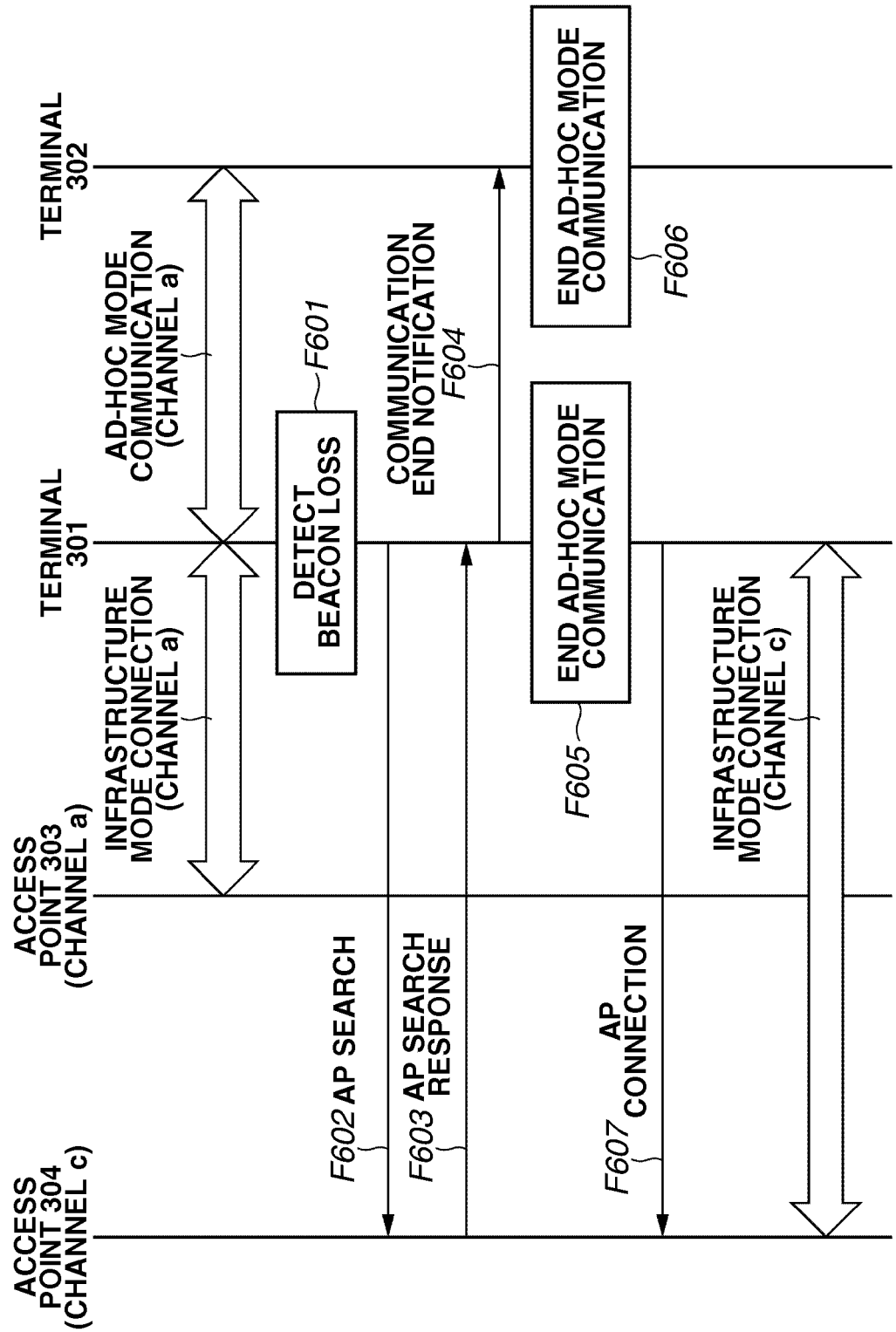

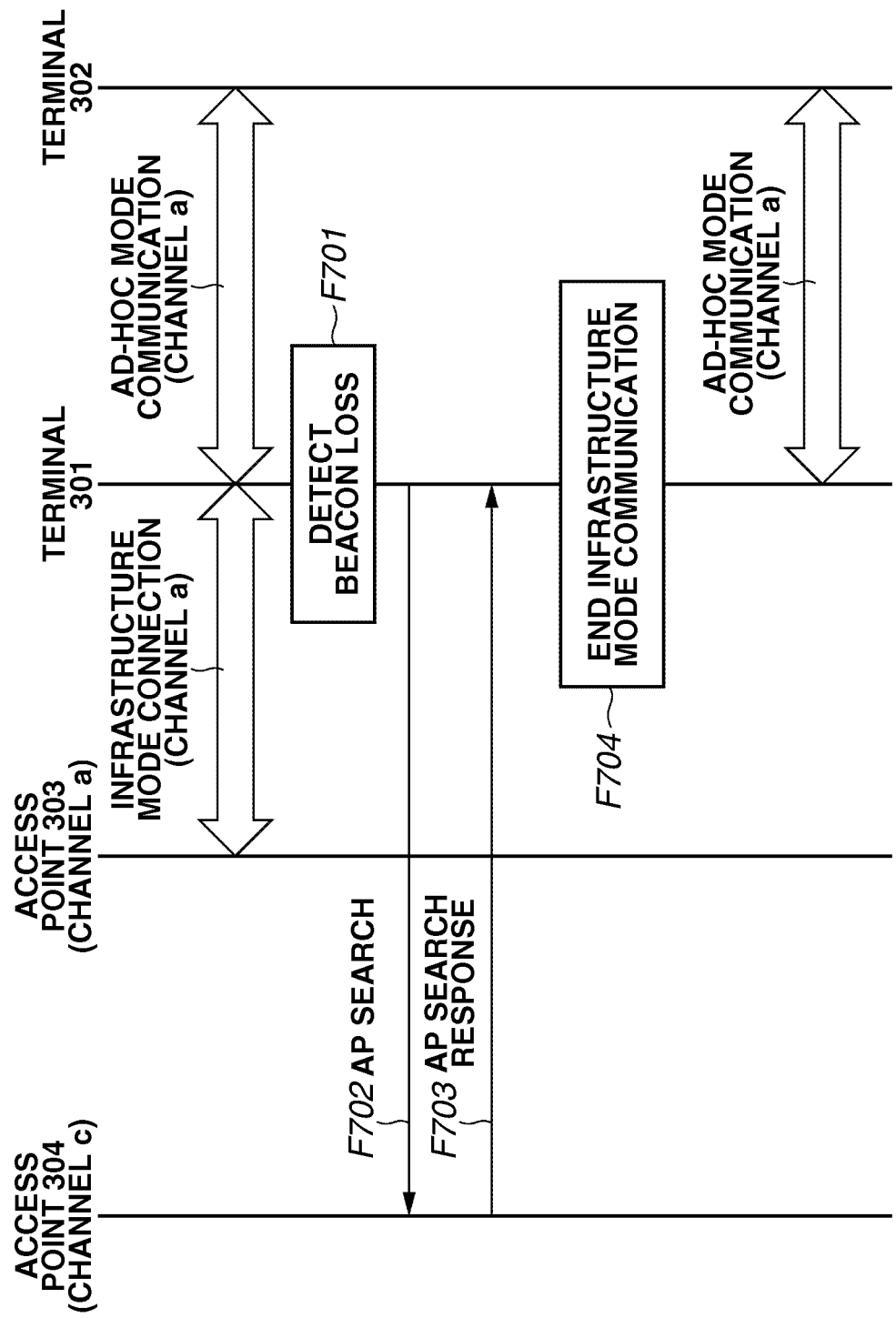

ure mode (an infrastructure mode) is changed due to a reason such as roaming, the communication on the side of the ad-hoc mode also needs to be changed to the same wireless LAN channel.
COMMUNICATION APPARATUS, METHOD FOR CONTROLLING COMMUNICATION APPARATUS, AND PROGRAM

BACKGROUND OF THE INVENTION

Field of the Invention

The present invention relates to a communication apparatus capable of participating in a plurality of networks, a method for controlling the communication apparatus, and a program.

Description of the Related Art

In wireless communication, such as a wireless local area network (LAN) which is atypical example, conforming with the standard series of Institute of Electrical and Electronics Engineers (IEEE) 802.11, an infrastructure mode, in which an access point (a base station) controls a network, and an ad-hoc mode, in which terminal apparatuses autonomously form a network, are defined.

A method for realizing connection to a base station in the infrastructure mode and simultaneously communicating with another terminal apparatus in the ad-hoc mode has been discussed (for example, see Japanese Patent Application Laid-Open No. 2005-64552).

The function constituting a plurality of networks using a single terminal apparatus is called a multi-basic service set (BSS) function. The multi-BSS function may be performed on a single wireless LAN interface due to a reason such as cost reduction. When the connection with a base station in the infrastructure mode and simultaneous communication with other terminal apparatuses in the ad-hoc mode are realized by the multi-BSS function, the communication of each mode is performed on the same wireless LAN channel (a frequency channel). Therefore, when the wireless LAN channel on the side of the infrastructure mode (an infrastructure mode) is changed due to a reason such as roaming, the communication on the side of the ad-hoc mode also needs to be changed to the same wireless LAN channel.

A case will be considered in which a terminal apparatus establishing connection to a base station in the infrastructure mode and simultaneously communicating with another terminal in the ad-hoc mode changes the communication channel of the side of the infrastructure mode because of roaming. In this case, when the terminal apparatus also changes the communication channel of the side of the ad-hoc mode, the terminal apparatus is separated from the ad-hoc network.

Therefore, communication with another terminal apparatus present in the ad-hoc network may become unavailable. Herein, when the other terminal apparatus detects the separation of the terminal apparatus having performed the roaming, the other terminal apparatus can detect the terminal apparatus having performing the roaming on another channel by scanning the wireless network. However, when the terminal apparatus having performed the roaming already ends the ad-hoc mode communication, the other terminal apparatus consequently scans the wireless network in vain in spite of the fact that the other terminal apparatus cannot detect the terminal apparatus having performed the roaming.

SUMMARY OF THE INVENTION

According to an aspect of the invention, a communication apparatus includes a first communication device configured to perform communication by connecting to a base station, a second communication device configured to perform communication without connection to a base station, a determination device configured to, in a case where the communication apparatus connects to a first network of a first base station via a first frequency channel by the first communication device and the communication apparatus participates in a second network via the first frequency channel without connection to the base station by the second communication device, determine whether a second frequency channel used by a second base station is usable in the communication performed by the second communication device, and a control device configured to control the communication without connection to the base station by the second communication device according to the determination by the determination device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a diagram illustrating a first process sequence of a terminal 301, a terminal 302, an access point (hereinafter, may be referred to as an "AP") 303, and an access point 304 in the network configuration according to the exemplary embodiment of the present invention.

FIG. 6 is a diagram illustrating a second process sequence of the terminal 301, the terminal 302, the access point 303, and the access point 304 in the network configuration according to the exemplary embodiment of the present invention.

FIG. 7 is a diagram illustrating a third process sequence of the terminal 301, the terminal 302, the access point 303, and the access point 304 in the network configuration according to the exemplary embodiment of the present invention.

DESCRIPTION OF THE EMBODIMENTS

Various exemplary embodiments, features, and aspects of the invention will be described in detail below with reference to the drawings.

Hereinafter, a first exemplary embodiment of the present invention will be described. A use example of a wireless LAN system conforming with the series of IEEE 802.11 will be described below, but a communication scheme is not limited to the wireless LAN conforming with the IEEE 802.11.

Figure 1:
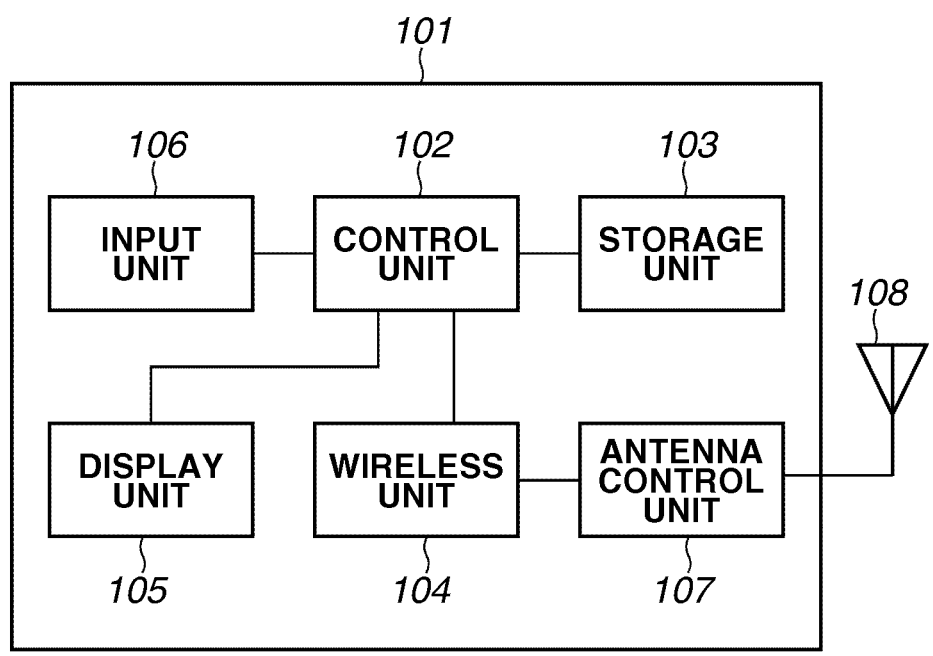
FIG. 1 is a block diagram illustrating a configuration of a communication apparatus according to an exemplary embodiment of the present invention.

A hardware configuration according to the present exemplary embodiment will be described. FIG. 1 is a block diagram illustrating an example of the configuration of each apparatus to be described below. An entire communication apparatus 101 is illustrated. A control unit 102 controls the entire communication apparatus by executing a control program stored in a storage unit 103, and includes a computer such as a CPU or an MPU. The control unit 102 also performs execution control of an automatic communication parameter setting process performed with another apparatus. The storage unit 103 stores a control computer program executed by the control unit 102 and various kinds of information such as a communication parameter. The control unit 102 executes the control program stored in the storage unit 103 to perform various processes to be described below. The storage unit 103 may include a memory such as a ROM or a RAM, a flexible disk, a hard disk, an optical disc, a magneto-optical disc, a CD-ROM, a CD-R, a magnetic tape, a non-volatile memory card, a DVD, and the like.

A wireless unit 104 performs wireless communication. A display unit 105 performs various displays and has a function of outputting visually recognizable information, as in an LCD or an LED, or outputting a sound, as in a speaker or the like. An input unit 106 is used by a user to perform various inputs. An antenna control unit 107 and an antenna 108 are provided.

Figure 2:
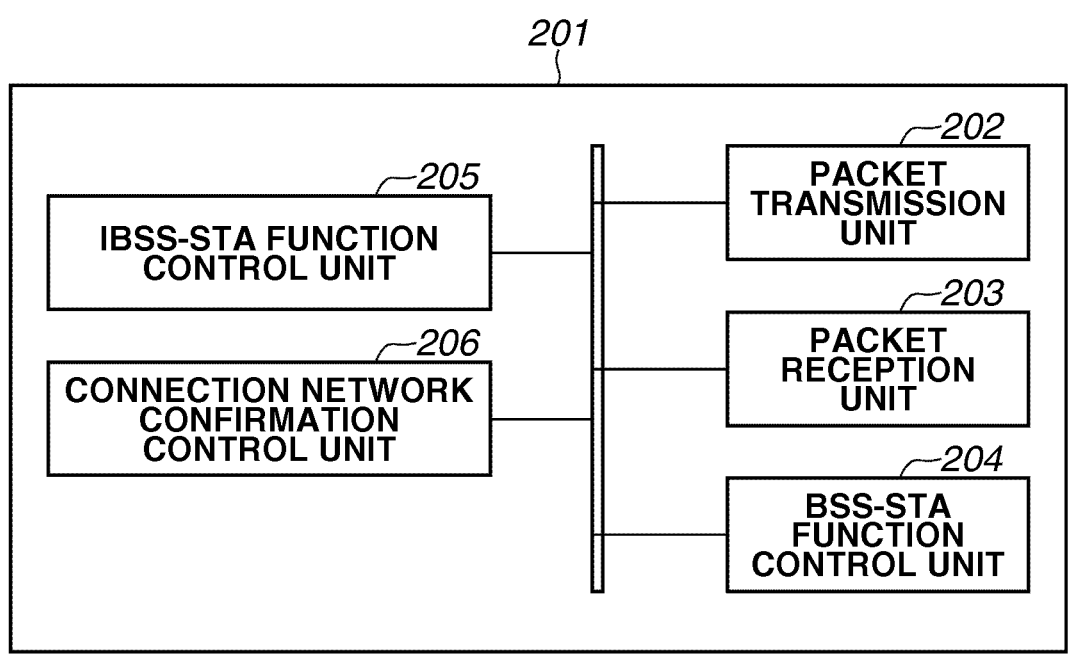
FIG. 2 is a diagram illustrating software functions of the communication apparatus according to the exemplary embodiment of the present invention.

FIG. 2 is a diagram illustrating an example of the configuration of software functional blocks performed by a communication apparatus that supports a multi-BSS function in a process to be described below. An entire apparatus 201 is illustrated. A packet transmission unit 202 transmits packets associated with various kinds of communication. The transmission of each signal to be described below is performed by the packet transmission unit 202. A packet reception unit 203 receives packets associated with various kinds of communication. The reception of each signal to be described below is performed by the packet reception unit 203. A BSS terminal station (STA) function control unit 204 controls a process of an infrastructure mode network (BSS) STA, which is connected to a base station (an access point) and performs wireless communication. The BSS-STA function control unit 204 performs processes of the infrastructure mode terminal station in a wireless LAN network, such as processes for transmitting and receiving a search signal of the base station and a process for connection with the base station. An independent basic service set (IBSS) STA function control unit 205 controls a process of an ad-hoc mode (IBSS) STA performing wireless communication without connection to the base station. The IBSS-STA function control unit 205 performs the process of the ad-hoc mode terminal station to be described below. A connection network confirmation control unit 206 confirms and controls a connection status of the apparatus itself with the network. The connection network confirmation control unit 206 performs a process at the time of a network switchover to be described below.

Figure 3:
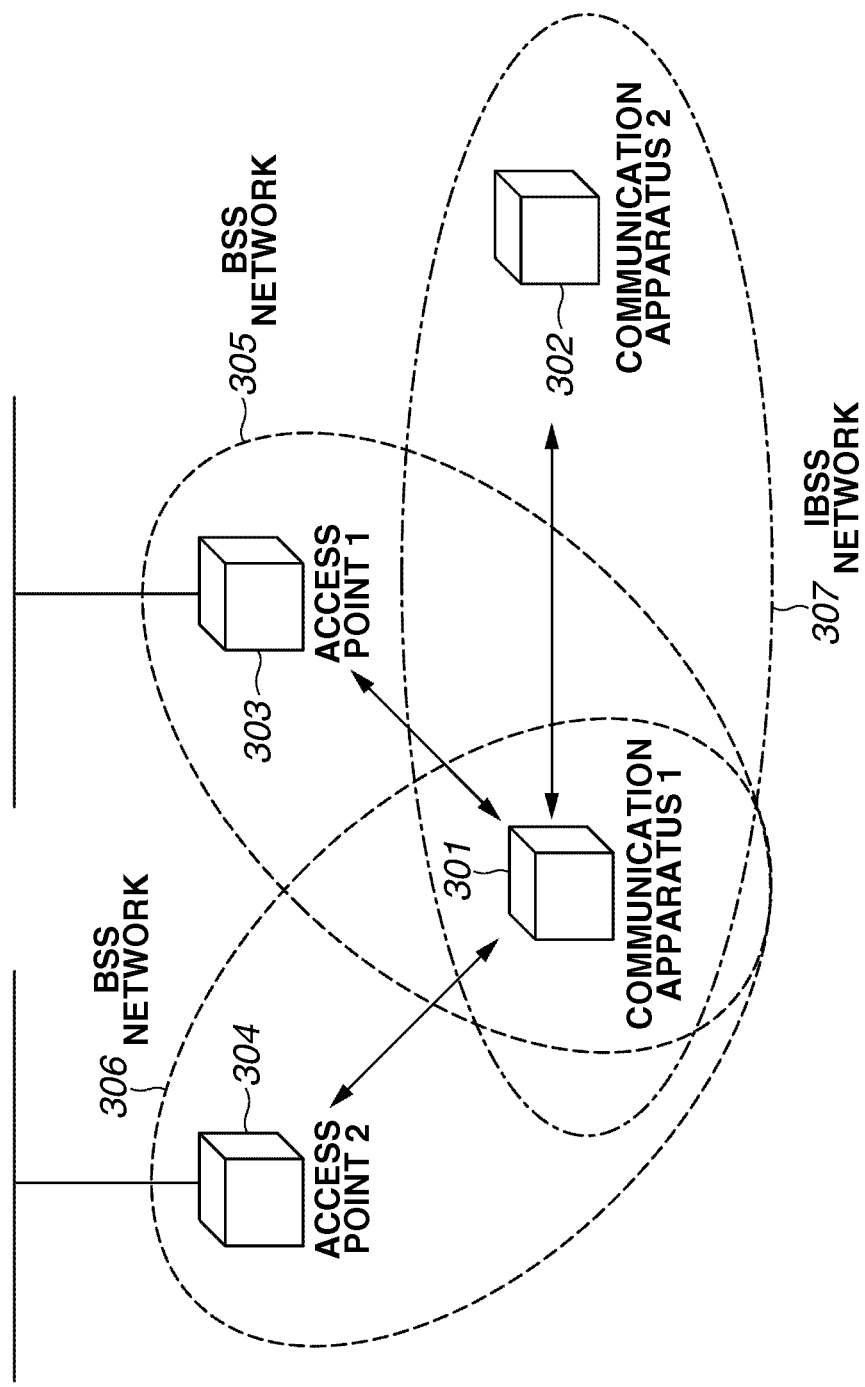
FIG. 3 is a diagram illustrating a network configuration according to the exemplary embodiment of the present invention.

FIG. 3 is a diagram illustrating a network group formed by a communication apparatus 301, a communication apparatus 302, an access point 303, and an access point 304. The communication apparatuses 301 and 302 have the configurations described in FIGS. 1 and 2. The communication apparatus 301 is connected to a BSS network 305 managed by the access point 303. The communication apparatuses 301 and 302 participate in an IBSS network 307. The access point 304 manages a BSS network 306. The BSS network is a basic network of the infrastructure mode. The IBSS network is a basic network of the ad-hoc mode.

In the present exemplary embodiment, the networks 305 and 306 have the same extended service set identification (ESSID), and thus are configured as networks capable of performing roaming.

Figure 4:
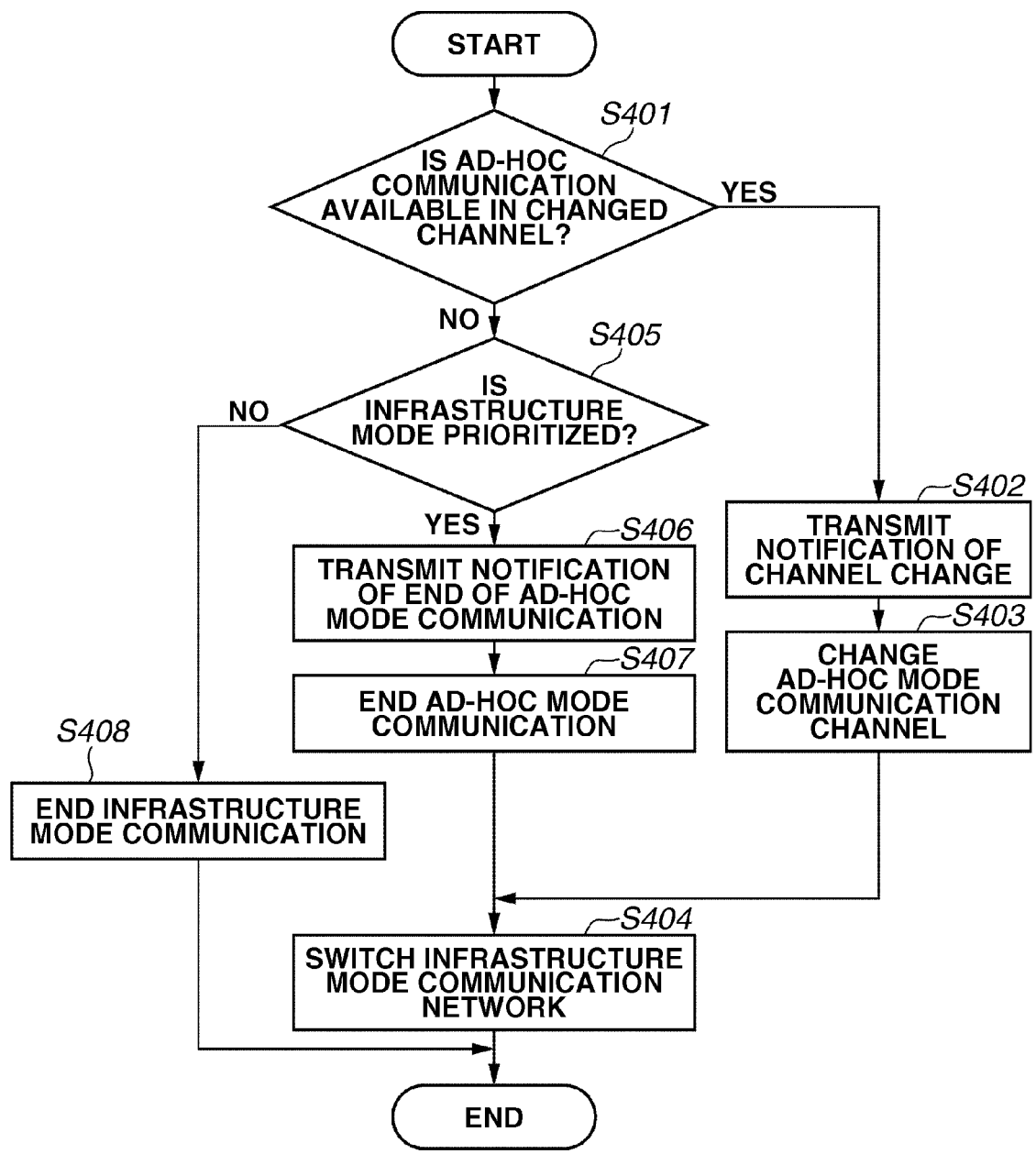
FIG. 4 is a flowchart illustrating a process at the time of a network switchover of the communication apparatus according to the exemplary embodiment of the present invention.

FIG. 4 is a flowchart illustrating a switchover process performed by the connection network confirmation control unit 206, when the communication apparatus 301 performing the multi-BSS function switches over (performs roaming) from the BSS network 305, to which the communication apparatus 301 is currently being connected, to the other BSS network 306. The switchover process in FIG. 4 is performed, when the control unit 102 reads and executes a computer program stored in the storage unit 103.

The process of FIG. 4 is performed, for example, when the network is switched by wireless LAN roaming. The switchover process may be performed, not only when wireless LAN roaming is performed, but also when the communication apparatus 301 is separated from the network, to which the communication apparatus 301 currently realizes BSS connection, and then detects another connectable network.

When the communication apparatus 301 is connected to the access point 303 in a wireless connection environment of the access point 303, the communication apparatus 301 establishes wireless connection to the access point 304, that is, the communication apparatus 301 starts a roaming process in that a wireless connection environment to the access point 304 becomes better.

When the connection network confirmation control unit 206 of the communication apparatus 301 detects the start of the roaming process, the connection network confirmation control unit 206 of the communication apparatus 301 determines whether the connections to the network of the infrastructure mode and to the network of the ad-hoc mode are in progress by the multi-BSS function. When the connections to the network of the infrastructure mode and the network of the ad-hoc mode are in progress by the multi-BSS function, the process of FIG. 4 is started. When only the connection to the network of the infrastructure mode is in progress, the roaming to the BSS network 306 of the access point 304 is performed.

In the process of FIG. 4, in step S401, the connection network confirmation control unit 206 of the communication apparatus 301 confirms whether the ad-hoc mode communication is available on the wireless LAN channel (a frequency channel) of the network after the switchover. Herein, the connection network confirmation control unit 206 confirms whether the wireless LAN channel to be used by the access point 304 of the BSS network 306, which is the wireless LAN channel of the network after the switchover, is a wireless LAN channel in which communication is prohibited in the ad-hoc mode.

When the network after the switchover is the wireless LAN channel in which communication is available in the ad-hoc mode (YES in step S401), then in step S402, the BSS-STA function control unit 204 notifies another terminal in progress of the ad-hoc mode communication that the communication apparatus 301 itself switches the wireless LAN channel. Herein, information indicating that the communication apparatus 301 itself switches the wireless LAN channel and information indicating the wireless LAN channel of the switching destination are broadcasted to the ad-hoc network before the switchover. By the notification of step S402, another communication apparatus can swiftly detect the switchover of the wireless LAN channel. Therefore, another communication apparatus can swiftly perform an appropriate process. For example, another communication apparatus can follow and change the wireless LAN channel.

After the notification in step S402, in step S403, the BSS-STA function control unit 204 changes the wireless LAN channel of the ad-hoc mode, and then in step S404, the IBSS-STA function control unit 205 switches the network of the infrastructure mode, so that communication is performed in the switching destination network. The switchover of the network of the infrastructure mode is performed by switching to the wireless LAN channel of the switching destination network (herein, the BSS network 306). However, the IBSS-STA function control unit 205 also performs a process for establishing connection to the access point 304.

Conversely, when the network to be switched is operating on the wireless LAN channel in which communication is not available in the ad-hoc mode as the determination result of step S401 (NO in step S401), then in step S405, the connection network confirmation control unit 206 confirms setting information to confirm which mode is prioritized between the infrastructure mode and the ad-hoc mode when the communication apparatus 301 performs the process. The setting information referred to in step S405 is stored in the storage unit 103. The setting information can be changed via a user's operation of the input unit 106.

When it is determined that the communication apparatus 301 prioritizes the infrastructure mode in step S405 (YES in step S405), then in step S406, the BSS-STA function control unit 204 notifies another terminal in progress of the ad-hoc mode communication that the communication apparatus 301 itself ends the ad-hoc mode communication.

After this notification, in step S407, the BSS-STA function control unit 204 ends the ad-hoc mode communication. In step S404, the IBSS-STA function control unit 205 switches the network of the infrastructure mode, and then performs communication in the switching destination network.

When it is set that the communication apparatus 301 prioritizes the ad-hoc mode in step S405 (NO in step S405), then in step S408, the IBSS-STA function control unit 205 ends the communication of the infrastructure mode and ends the process. Note that, when it is set that the communication apparatus 301 prioritizes the ad-hoc mode in step S405, the communication apparatus 301 does not perform roaming from the BSS network 305 to the BSS network 306. Therefore, the communication apparatus 301 continues the wireless connection with the access point 303, as long as the communication apparatus 301 can make the wireless connection with the access point 303 in the BSS network 305.

In the notification process of step S402, a broadcast message is transmitted to the ad-hoc network. However, the message may be exchanged individually between the respective communication apparatuses.

In the setting information referred to in step S405, a priority mode may be fixedly set. For example, the infrastructure mode is normally prioritized. Alternatively, the mode may be dynamically set according to an application that is being executed. For example, a process mode may be prioritized during real-time communication.

When the wireless LAN channel is used in which the network after the switchover is the same as the network before the switchover, the connection network confirmation control unit 206 may switch the network without performing the process illustrated in FIG. 4.

FIG. 5 is a diagram illustrating a connection processing sequence of a case in which the communication apparatus 301 performs wireless LAN roaming due to a reason such as movement of the communication apparatus 301 and switches the connection to the BSS network 306 of the access point 304, when the communication apparatus 301 is connected to the access point 303. Herein, since the communication apparatus 301 performs the multi-BSS function, the communication apparatus 301 forms the IBSS network 307 with the communication apparatus 302 to perform the ad-hoc mode communication therebetween. The BSS network 305 and the IBSS network 307 operate on a wireless LAN channel a (a frequency channel a). The BSS network 306 is assumed to operate on a wireless LAN channel b (a frequency channel b) in which the ad-hoc mode communication is available.

In step F501, the communication apparatus 301 detects loss of a beacon from the access point 303 and starts a wireless LAN roaming process.

In step F502, the communication apparatus 301 searches for a neighborhood AP, for example, by scanning wireless LANs. Then in step F503, when the communication apparatus 301 receives a response signal from the access point 304, the communication apparatus 301 selects the network 306 as a roaming destination.

After the communication apparatus 301 selects the network 306, then in step F504, the communication apparatus 301 performs the network switchover process described in FIG. 4. Since the ad-hoc mode communication is available on the wireless LAN channel b, the communication apparatus 301 notifies the communication apparatus 302 of an intention to change the wireless LAN channel of the communication apparatus 301 itself and of switchover to the wireless LAN channel b.

After this notification, in step F505, the communication apparatus 301 switches the wireless LAN channel of the ad-hoc mode to the wireless LAN channel b. Likewise, in step F506, the communication apparatus 302 having received the notification changes the wireless LAN channel of the ad-hoc mode to the wireless LAN channel b.

After the communication apparatus 301 changes the wireless LAN channel of the ad-hoc mode, then in step F507, the communication apparatus 301 connects to the network 306 to complete the wireless LAN roaming.

Thus, when the wireless LAN channel of the infrastructure mode is switched to the channel in which the ad-hoc mode communication is available by performing the switchover process described in FIG. 4, the switchover to the wireless LAN channel of the ad-hoc mode can be swiftly performed.

FIG. 6 is a diagram illustrating a connection processing sequence of a case in which the communication apparatus 301 switches the connection to the BSS network 306 operating on a wireless LAN channel c, in which the ad-hoc mode communication is not available. Herein, it is set that the communication apparatus 301 prioritizes the communication of the infrastructure mode.

In step F601, the communication apparatus 301 detects loss of a beacon from the access point 303 and starts a wireless LAN roaming process.

In step F602, the communication apparatus 301 searches for a neighborhood AP, for example, by scanning wireless LANs. Then in step F603, when the communication apparatus 301 receives a response signal from the access point 304, the communication apparatus 301 selects the network 306 as a roaming destination.

After the communication apparatus 301 selects the network 306, then in step F604, the communication apparatus 301 performs the network switchover process described in FIG. 4. Since the ad-hoc mode communication is not available on the wireless LAN channel c, the communication apparatus 301 notifies the communication apparatus 302 of an intention to end the ad-hoc mode communication.

After this notification, in step F605, the communication apparatus 301 ends the ad-hoc mode communication. Likewise, in step F606, the communication apparatus 302 having received the notification also ends the ad-hoc mode communication.

After the communication apparatus 301 ends the ad-hoc mode communication, then in step F607, the communication apparatus 301 connects to the network 306 to complete the wireless LAN roaming.

FIG. 7 is a diagram illustrating a sequence of a case in which the network of the access point 304 serving as a roaming target operates on the wireless LAN channel c, in which the ad-hoc mode communication is not available. In this case, the communication apparatus 301 is set to prioritize the ad-hoc mode communication.

In step F701, the communication apparatus 301 detects loss of a beacon from the access point 303 and starts a wireless LAN roaming process.

In step F702, the communication apparatus 301 searches for a neighborhood AP, for example, by scanning a wireless LAN. Then in step F703, when the communication apparatus 301 receives a response signal from the access point 304, the communication apparatus 301 selects the network 306 as a roaming destination.

After the communication apparatus 301 selects the network 306, then in step F704, the communication apparatus 301 performs the network switchover process described in FIG. 4. Since the ad-hoc mode communication is not available on the wireless LAN channel c, the communication apparatus 301 ends the communication of the infrastructure mode and continues the ad-hoc mode communication.

Thus, by performing the switchover process described in FIG. 4, the priority communication mode can continuously be performed and the non-priority communication mode can swiftly end, when the wireless LAN channel is changed to the channel in which the ad-hoc mode communication is not available.

According to the present exemplary embodiment, in a case where a communication apparatus participates in a network in which communication for connection to the base station is performed and communication is performed without connection to the base station, when a process of changing the base station is detected, a process can be performed to be suitable for the frequency channel of a base station of the change destination. For example, in a case where the frequency channel of the base station of the change destination can be used even in the communication performed without connection to the base station, the change in the frequency channel can be notified of. Therefore, the frequency channel of another communication apparatus can swiftly be changed. Further, in a case where the frequency channel of the base station of the change destination cannot be used in the communication performed without connection to the base station, either communication can be prioritized to be performed between the communication for connection to the base station and the communication performed without connection to the base station. Since the user can set the communication to be prioritized, the usability can be improved.

The exemplary embodiment of the present invention has hitherto been described, but the exemplary embodiment is an example of the description of the invention. The scope of the invention is not limited only to the exemplary embodiment. The exemplary embodiment may be modified in various forms within the scope of the invention without departing from the gist of the invention. Further, the example of the wireless LAN conforming with the IEEE 802.11 has been described. However, the exemplary embodiment may be applied to other wireless media, such as a wireless universal serial bus (USB), multi band orthogonal frequency division multiplexing (OFDM) alliance (MBOA), Bluetooth (registered trademark), a ultra-wideband (UWB), and ZigBee (registered trademark).

Herein, the UWB includes a wireless USB, wireless 1394, and WiNET.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-263420 filed Dec. 1, 2011, which is hereby incorporated by reference herein in its entirety.

What is claimed is:

1. A communication apparatus comprising:
a wireless interface;
at least one processor; and
a memory coupled with the at least one processor;
wherein the at least one processor that executes instructions stored in the memory implements:
   a first communication unit configured to communicate via a base station using the wireless interface over a first wireless network;
   a second communication unit configured to communicate, using the wireless interface, with another communication apparatus not via any base station over a second wireless network which is different from the first wireless network; and
   a control unit configured to, in a case where a channel used for communication performed by the first communication unit is changed from a first frequency channel operating at a first frequency to a second frequency channel operating at a frequency different than the first frequency when communication using the first frequency channel is being performed by the first communication unit over the first wireless network and communication, with the other communication apparatus using the first frequency channel is being performed by the second communication unit over the second wireless network,
   (i) control the second communication unit to continue to communicate with the other communication apparatus using the second frequency channel, and to end the communication with the other communication apparatus if the communication with the other communication apparatus is not available in the second frequency channel, and (ii) control the first communication unit to continue to communicate via the base station if the communication performed by the first communication unit is prioritized over the communication performed by the second communication unit, and to end the communication performed by the first communication unit if the communication performed by the first communication unit is not prioritized over the communication performed by the second communication unit, wherein the prioritization is performed by an application that is being executed on the communication apparatus.

2. The communication apparatus according to claim 1, wherein the control unit controls the second communication unit to transmit information indicative of the second frequency channel to a communication partner apparatus in the first frequency channel.

3. The communication apparatus according to claim 1, wherein, in a case where the first communication unit switches a connection from a base station that communicates using the first frequency channel to a base station that communicates using the second frequency channel, the control unit controls the second communication unit to communicate using the second frequency channel.

4. The communication apparatus according to claim 1, wherein, in a case where the second frequency channel is unusable in communication by the second communication unit, the control unit does not change the frequency channel used by the first communication unit to communicate to the second frequency channel.

5. The communication apparatus according to claim 1,
wherein the at least one processor further implements a storage unit configured to store information used to determine whether the communication performed by the first communication unit is prioritized over the communication performed by the second communication unit or the communication performed by the second communication unit is prioritized over the communication performed by the first communication unit wherein the prioritization is performed by the application that is being executed on the communication apparatus; and
wherein, in a case where the second frequency channel is unusable in communication of the second communication unit, the control unit performs one of first process for ending communication of the second communication unit and second process for continuing communication of the second communication unit using first the frequency channel, according to the information stored in the storage unit.

6. The communication apparatus according to claim 5, wherein the information used to determine whether communication of the first communication unit is prioritized or communication of the second communication unit is prioritized is set by a user.

7. A method for controlling a communication apparatus that includes a wireless interface, a first communication unit configured to communicate via a base station using the wireless interface over a first wireless network, and a second communication unit configured to communicate, using the wireless interface, with another communication apparatus not via any base station over a second wireless network which is different from the first wireless network, the method comprising:
using a control unit, in a case where a channel used for communication performed by the first communication unit is changed from a first frequency channel operating at a first frequency to a second frequency channel operating at a frequency different than the first frequency when communication using the first frequency channel is being performed by the first communication unit over the first wireless network and communication, with the other communication apparatus, using the first frequency channel is being performed by the second communication unit over the second wireless network,
(i) to control the second communication unit to continue to communicate with the other communication apparatus using the second frequency channel, and to end the communication with the other communication apparatus if the communication with the other communication apparatus is not available in the second frequency channel, and
(ii) to control the first communication unit to continue to communicate via the base station if the communication performed by the first communication unit is prioritized over the communication performed by the second communication unit, and to end the communication performed by the first communication unit if the communication performed by the first communication unit is not prioritized over the communication performed by the second communication unit,
wherein the prioritization is performed by an application that is being executed on the communication apparatus.

8. A non-transitory computer-readable storage medium storing a program that causes a computer to execute a method for controlling a communication apparatus that includes a wireless interface, a first communication unit configured to communicate via a base station using the wireless interface over a first wireless network, and a second communication unit configured to communicate, using the wireless interface, with another communication apparatus not via any base station over a second wireless network which is different from the first wireless network, the method comprising:
performing control, in a case where a channel used for communication performed by the first communication unit is changed from a first frequency channel operating at a first frequency to a second frequency channel operating at a frequency different than the first frequency when communication using the first frequency channel is being performed by the first communication unit over the first wireless network and communication, with the other communication apparatus, using the first frequency channel is being performed by the second communication unit over the second wireless network,
(i) to control the second communication unit to continue to communicate with the other communication apparatus using the second frequency channel, and to end the communication with the other communication apparatus if the communication with the other communication apparatus is not available in the second frequency channel, and
(ii) to control the first communication unit to continue to communicate via the base station if the communication performed by the first communication unit is prioritized over the communication performed by the second communication unit, and to end the communication performed by the first communication unit if the communication performed by the first communication unit is not prioritized over the communication performed by the second communication unit, wherein the prioritization is performed by an application that is being executed on the communication apparatus.

9. The communication apparatus according to claim 1, wherein the first communication unit communicates in an infrastructure mode.

10. The communication apparatus according to claim 1, wherein the second communication unit communicates in an ad-hoc mode.

11. The communication apparatus according to claim 1, further comprising
a scan unit configured to, in a case where, when communication is performed by the first communication unit using a first frequency channel and communication is performed by the second communication unit using the first frequency channel, the first communication unit becomes unable to detect a signal including a predetermined network identifier in the first frequency channel, perform scan process,
wherein the communication apparatus selects the second frequency channel as a frequency channel used for communication performed by the first communication unit based on a scan result obtained by the scan unit.

12. The communication apparatus according to claim 11, wherein the scan unit, based on reception of a response signal transmitted in response to a search signal that the scan unit has transmitted, performs scan process.

13. The communication apparatus according to claim 11,
wherein the scan unit performs scan process to detect a network identified by the predetermined network identifier, the network to which the first communication unit has connected using the first frequency channel,
wherein, in a case where the network identified by the predetermined network identifier has been detected using the second frequency channel through the scan process performed by the scan unit, the communication apparatus selects the second frequency channel as the frequency channel used for the communication performed by the first communication unit.

14. The communication apparatus according to claim 1, wherein, in a case where the first communication unit becomes unable to detect a beacon from the base station to which the first communication unit connects using the first frequency channel, the first communication unit changes a channel used for communication from the first frequency channel to the second frequency channel.

15. The communication apparatus according to claim 1, wherein, in a case where the channel used for the communication performed by the first communication unit is changed from the first frequency channel to the second frequency channel, the control unit controls the second communication unit not to terminate operation of the second communication unit.

16. The communication apparatus according to claim 1, wherein each of the first communication unit and the second communication unit performs wireless communication conforming to a series of IEEE 802.11.

17. The communication apparatus according to claim 1, wherein each of the first communication unit and the second communication unit performs communication using a shared antenna provided in the wireless interface.

18. The communication apparatus according to claim 1, wherein each of the first communication unit and the second communication unit performs communication using a shared antenna control unit that is provided in the wireless interface and controls the shared antenna.

19. The communication apparatus according to claim 1, wherein each of the first communication unit and the second communication unit performs communication using a shared wireless unit configured to perform wireless communication.

20. The communication apparatus according to claim 1, further comprising a detection unit configured to detect disruption in communication with the base station using the first frequency channel by the first communication unit,
wherein the control unit is configured to control the second communication unit to communicate with the other communication unit using the second frequency channel, in a case where the communication apparatus determines that communication using the second frequency channel by the first communication unit is continuable after the detection unit detects disruption in communication with the base station using the first frequency channel by the first communication unit.

21. The communication apparatus according to claim 20, wherein the detection unit is configured to detect disruption in communication with the base station using the first frequency channel by the first communication unit in a case where a beacon is not detected from the base station in the first frequency channel.

22. The communication apparatus according to claim 1, wherein the prioritization is performed by a user of the communication apparatus.

* * * * *